Jan. 6, 1925.  1,521,705

R. C. NORMAN, JR
BRAKING AND ANTISKID DEVICE
Filed March 28, 1923 4 Sheets-Sheet 1

Inventor
Robert Charles Norman Jr.
by his Attorneys

Jan. 6, 1925. 1,521,705
R. C. NORMAN, JR
BRAKING AND ANTISKID DEVICE
Filed March 28, 1923 4 Sheets-Sheet 2
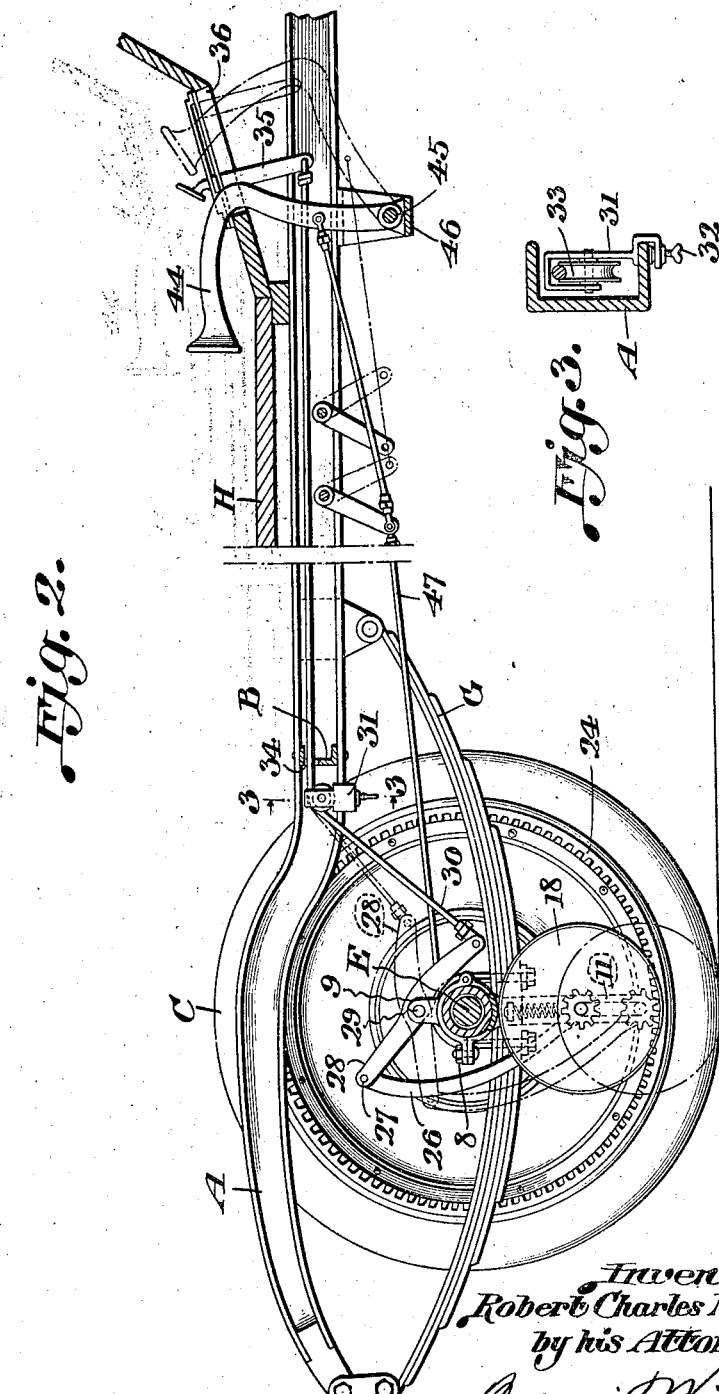

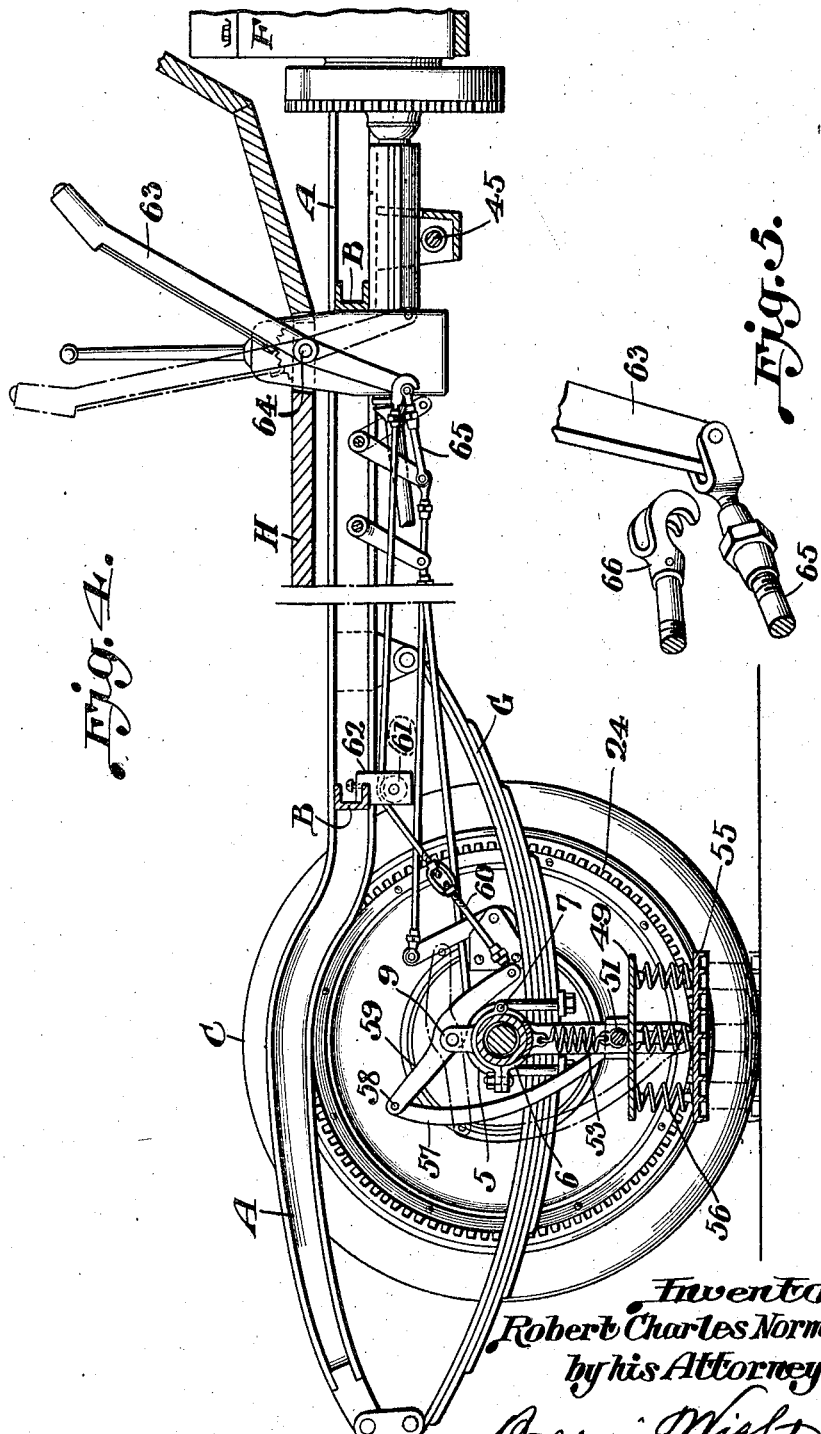

Inventor
Robert Charles Norman, Jr.
by his Attorneys

Patented Jan. 6, 1925.

1,521,705

UNITED STATES PATENT OFFICE.

ROBERT CHARLES NORMAN, JR., OF NEW YORK, N. Y.

BRAKING AND ANTISKID DEVICE.

Application filed March 28, 1923. Serial No. 628,254.

*To all whom it may concern:*

Be it known that I, ROBERT CHARLES NORMAN, Jr., a citizen of the United States, and resident of New York, in the county of Kings and State of New York, have invented certain new and useful Improvements in Braking and Antiskid Devices, of which the following is a specification.

The invention relates to an attachment for automobiles which may be used to prevent skidding on slippery streets or roads, and at the same time will act as a brake.

An object of the invention is to provide such an attachment consisting of two brakes, one of which is connected to be operated by the emergency brake, and the other is mounted to be operated with the service brake or independently thereof.

Another object is to provide an attachment wherein the auxiliary brakes or antiskid devices may be readily disconnected when it is not desired to use the same, and which may be quickly removed from the machine.

Other objects will be apparent from the following detailed description and the appended claims.

In the drawings:

Figure 2 is a longitudinal section with parts in elevation, showing one of the braking devices.

Figure 3 is a detail view on line 3—3 of Fig. 2.

Figure 4 is a longitudinal section with parts in elevation, showing the other of the braking devices.

Figure 5 is a detail of the connection of this device to the emergency brake.

The invention is capable of attachment to any standard automobile, and only such parts of the automobile have been shown that are necessary to make clear the attachment and operation of the device. They include the side bars A and cross bars B of the chassis, rear wheels C, a casing D in which turns the rear axle E, engine F from which power is transmitted to the rear axle in the usual manner, springs G, and a portion of the floor H. These parts may be of any old or desired construction.

Figures 6, 7, 8:
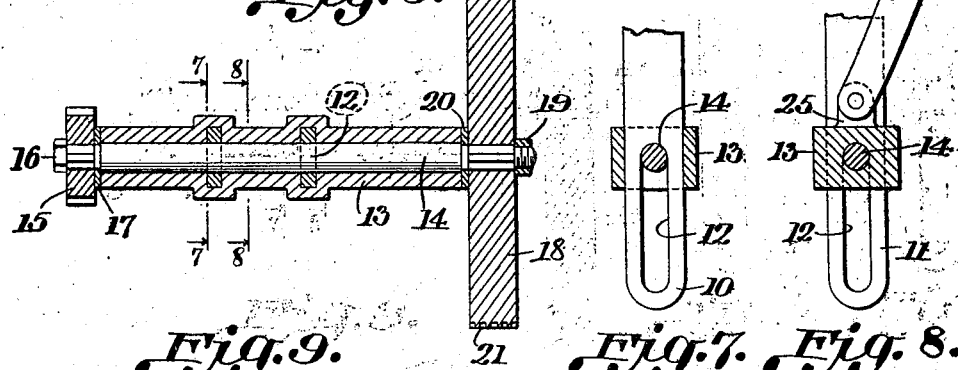
Figure 6 is a section through the support for the driving shaft for one brake mechanism and the braking element operated thereby.
Figure 7 is a section on the line 7—7 of Figure 6.
Figure 8 is a section on the line 8—8 of Figure 6.

Mounted on the rear axle casing D are four supporting members 1, 2, 3 and 4, substantially alike. Each member consists of an upper semicircular half 5 and a lower semicircular half 6 hinged at one side at 7 and fastened at the other side by bolts 8. This permits ready attachment and detachment. Each upper half 5 has a lug 9 rising therefrom to which is pivoted an operating member hereinafter described. Integral with, or rigidly carried by each lower half 6 are two guide members 10 and 11 each provided with a longitudinal slot 12. A housing 13 is provided with openings through which pass the guides 10 and 11, and within said housing is a shaft 14 which passes through the slots in the guides 10 and 11. These elements are illustrated in Figures 6, 7 and 8, and are assembled by passing the housing 13 up over the guide members 10 and 11, and then passing the shaft 14 through the housing and slots 12.

Figure 9:
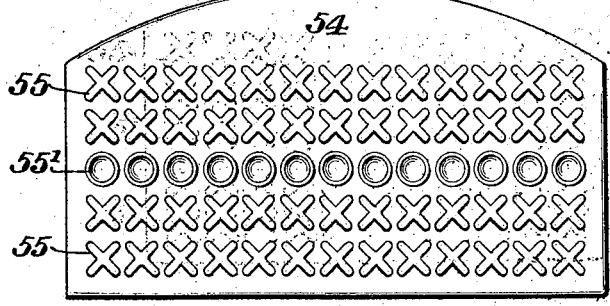
Figure 9 is a bottom plan view of one braking device.

On one reduced end of the shaft 14 is non-rotatably mounted a pinion 15 held in place by a nut 16 and separated from the housing 13 by a washer 17. On the other end of the shaft is non-rotatably mounted a wheel 18, held in place by a nut 19 and separated from the housing by a washer 20. The periphery 21 of this wheel is roughened or provided with suction cup depressions similar to those shown in Figure 9. On the outside of each guide 10 is a lug 22 to which is attached one end of a spring 23, the other end of which is fastened to the housing 13 and tends to draw it upwardly as far as permitted by the slots 12 in the guides 10 and 11. Attached to the inner side of the wheels C in any suitable manner is an annular member provided with an internal gear 24 with which the pinion 15 is adapted to mesh when depressed. The parts are so proportioned that when the pinion is in mesh with the gear 24, the periphery of wheel 21 will be in engagement with the ground or pavement.

Figure 10:
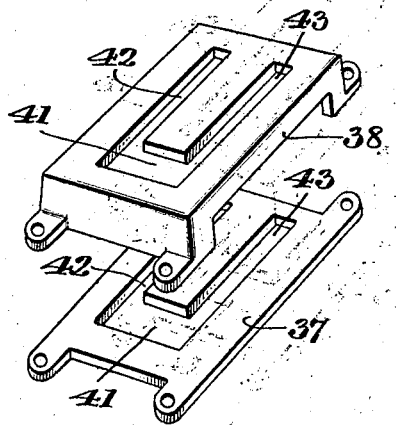
Figure 10 is a disassembled view of the guide for the foot pedal of one braking device.
Figure 11:
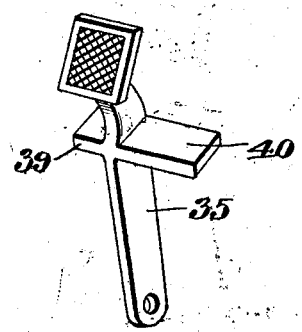
Figure 11 is a perspective view of the pedal which works in the guide shown in Figure 10.

The housing 13 together with the parts carried thereby, is moved downwardly by means which will now be described. At its upper side the housing is provided with a lug or ear 25 to which is pivoted a curved arm 26 pivoted at its other end at 27 to a lever 28 which is pivoted on the lug 9 and has a cable 30 connected to its opposite end. On the inside of the channel side frame member A of the chassis is mounted a bracket 31 by means of a set screw 32 (see Fig. 3) and this bracket supports a pulley 33. The cable 30 runs over this pulley through a hole 34 in the cross frame member B, and is attached at its front end to a pedal member 35, particularly shown in Figure 11. An opening 36 is formed in the floor H, and the pedal extends therethrough. A plate 37 overlies said opening and a plate 38 overlies the plate 37 and is slightly spaced therefrom as shown. These two plates are shown disassembled in Figure 10. Each plate has a U-shaped slot with a base portion 41, a side branch 42 and a second side branch 43. The pedal 35 is provided with two arms 39 and 40 which are a sliding fit in the space between the two plates 37 and 38, so that pressure against the pedal will slide it forward in this space and exert a pull on the cable 30, rocking the lever 28 from full line to dotted line position in Figure 2, moving the pinion 15 into engagement with the internal gear 24 and the wheel 18 into engagement with the roadway. Then as the rear wheels are driven in the usual manner, the wheels 18 are revolved and have a braking effect as well as preventing skidding.

When the pedal 35 is positioned so that it is moved forward in the slot 42, it is moved independently by pressure of the foot thereagainst. When it is moved sidewise in the space 41 it is locked against forward movement. When it is moved still further sidewise into register with the slot 43, the arm 40, which is longer than the arm 39, will project outwardly into position to be engaged by the service brake pedal 44 which is pivoted at 45 in a depending bracket 46 and connected by the usual connections 47 to the usual or any desired form of brake which is not illustrated as it forms no part of the invention. When the pedal 35 is in this position, it will be moved by the movement of the service brake pedal 44, thus applying the ordinary service brake and the auxiliary mechanism as described above.

Figure 1:
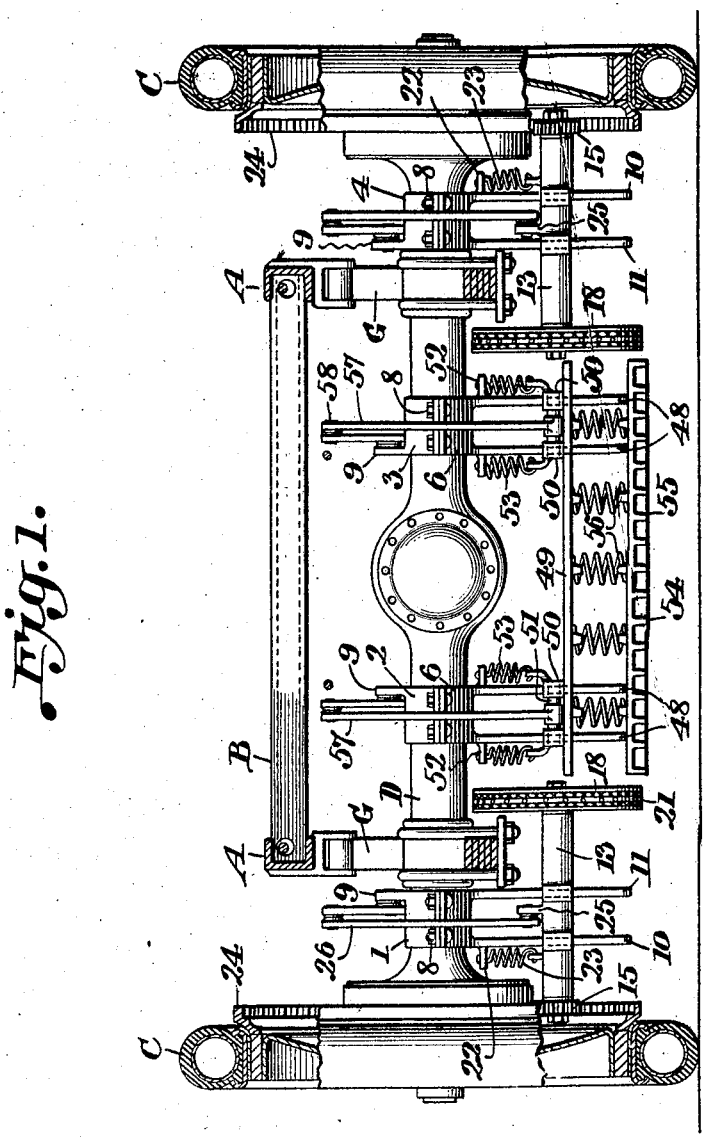
Figure 1 is a rear elevation of an automobile equipped with my invention, the wheels and frame being shown partly in section.

The mechanism including the wheel 18 and operating means therefor is duplicated at each side of the machine as shown in Figure 1, but the cable 30 has been shown on one side only to avoid unnecessary illustration. A branch cable will lead to the mechanism on the opposite side of the machine in order that both wheels 18 may be moved into operative position simultaneously.

The lower half 6 of each of the supports 2 and 3 is provided with downwardly extending guides 48 similar to the guides 10 and 11. A plate 49 has upwardly extending ears 50 fitting over said guides and these ears support a short shaft 51. The construction is the same as that shown in Figures 7 and 8 for the other guides, and is not illustrated in detail. Lugs 52 extend from the guides 48 and to these are attached one end of springs 53 which are connected at their other ends to the ears 50 and normally hold the plate 49 in its upper position. A second plate 54 having a curved front end and provided on its bottom with suitable corrugations 55 and suction cups 55′, is suspended from the plate 49 by springs 56 or any suitable yielding suspension. A lever 57 is pivotally connected with the short shaft 51 and is pivoted at 58 to a lever 59 pivoted in the ear 9, a cable 60 being connected to the other end of the lever 59. This cable passes over a pulley 61 carried by a bracket 62 attached to one of the cross members B. The usual emergency brake lever 63 is employed which is pivoted at 64 and is connected by suitable means 65 to the emergency brake which is not illustrated in detail as it forms no part of the invention. The forward end of the cable 60 is provided with a hook 66 (see Figure 5) for quick attachment to the connections operated by the emergency brake. When detached it may be hooked over a pin provided at any suitable point on the frame. Obviously, when the emergency brake is moved from full to dotted line position in Figure 4, the pull on the cable 60 will rock the lever 58 to dotted line position and lower the plates 49 and 54 until the bottom plate 54 is brought into engagement with the roadbed. This will exert a marked braking effect and also prevent skidding.

It will be noted that the two brakes may be used together or separately. If the pedal 35 is in position to be moved independently of the service brake, the emergency brake and the pedal 35 may be operated together. The pedal 35 may be operated alone, or with the service brake as has been described. It is evident that applicant has a very flexible system in which a large amount of braking power may be applied, and that the braking and antiskid mechanism produces no particular strain on the automobile itself or the running parts thereof.

There will necessarily be two cables 60 or a branch from one to operate both levers 57, but it has not been thought necessary to illustrate both. The cables will be adjusted as regards length so that the foot and emergency brakes will begin to exert a braking force a little before the antiskid device comes into operation. For this reason, each cable will be provided with a turnbuckle or some equivalent device for adjusting its length to obtain the proper relation between the parts.

The peripheries of wheels 21 may be thrown into engagement with the roadway without application of the foot brake when it is desired to get a greater pulling traction on a wet or icy street when starting the car. This will prevent skidding and side slip at such times.

Since the foot brake is not locked, there is no danger of a too sudden stop, since this can be released as desired. Furthermore the member 54 is rounded at its front end, so that it will push aside or ride over any obstruction. Moreover the springs 56 will allow yielding of this part when necessary. The device is especially effective because it brings into play a braking surface of large area which will stop the car more quickly and with less wear on the wheels. It is always attached to the car and can be connected for operation in a moment.

Obviously many changes in details can be made by any one skilled in the art, and variations in the exact position of some parts may be found necessary when applying the invention to different machines. It is understood that the invention is to be regarded as limited only by the scope of the appended claims.

I claim as my invention:

1. A brake and anti-skid device for vehicles provided with the ordinary brakes, comprising a braking member normally out of contact with the roadbed and means actuated by the application of one of the ordinary brakes or independently thereof for moving said member into contact with the roadbed.

2. A brake and antiskid device for vehicles provided with the usual brakes, comprising a braking member normally out of contact with the roadbed, means for applying one of the usual brakes, and devices operated by said means for moving said member into contact with the roadbed.

3. A brake and anti-skid device for vehicles comprising a rotatable brake member normally out of contact with the roadbed, guiding means therefor, and means for moving said brake member on said guides into contact with the roadbed.

4. A brake and anti-skid device for vehicles comprising guides carried by the frame of the machine, a housing slidable thereon, a shaft carried by said housing, a braking wheel on one end of the shaft, a pinion on said shaft, an internal gear carried by the vehicle wheel, and means for moving the housing to bring the pinion into mesh with the internal gear and the braking wheel into contact with the roadbed.

5. A brake and anti-skid device for vehicles comprising guides carried by the rear axle housing, a support slidable on said guides, a shaft mounted in the support, a braking wheel on said shaft, a pinion also on said shaft, a gear member on the vehicle wheel, and means for moving the support to bring the pinion and gear into mesh and the braking wheel into contact with the roadbed.

6. A brake and anti-skid device for vehicles comprising guides detachably carried by the rear axle housing, a support slidable on said guides, a rotatable braking member carried thereby, springs for holding said member in inactive position, and means for sliding said support to move the braking member into engagement with the roadbed.

7. A brake and anti-skid device for vehicles comprising a rotatable brake member normally out of contact with the roadbed, guides therefor, means for sliding the brake member on the guides into contact with the roadbed, and means driven by a wheel of the vehicle for rotating the brake member when in contact with the roadbed.

8. A brake and anti-skid device for vehicles comprising a rotatable brake member normally out of contact with the roadbed, a shaft carried thereby, an internal gear on a wheel of the vehicle, guides for said brake member, means for moving the brake member on the guides into contact with the roadbed, and a gear carried by said shaft and brought into engagement with the gear on the wheel by said movement.

In testimony whereof, I have hereunto subscribed my name.

ROBERT CHARLES NORMAN, Jr.